US008436692B2

United States Patent
Zhang (10) Patent No.: US 8,436,692 B2
(45) Date of Patent: May 7, 2013

(54) EMI TRAP USING MICROWAVE CIRCUIT

(75) Inventor: YongShan Zhang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 285 days.

(21) Appl. No.: 12/833,408

(22) Filed: Jul. 9, 2010

(65) Prior Publication Data

US 2012/0007689 A1    Jan. 12, 2012

(51) Int. Cl.
*H04B 3/28* (2006.01)
*H03H 7/00* (2006.01)

(52) U.S. Cl.
USPC ............................................ 333/12; 333/181

(58) Field of Classification Search ............. 333/12, 333/181, 184
See application file for complete search history.

(56) References Cited

U.S. PATENT DOCUMENTS

| 6,933,800 B2* | 8/2005 | Wallace et al. ................. 333/12 |
| 7,336,904 B2* | 2/2008 | Moran ......................... 398/136 |
| 8,081,051 B2* | 12/2011 | Huang et al. .................. 333/204 |

* cited by examiner

*Primary Examiner* — Dean O Takaoka
(74) *Attorney, Agent, or Firm* — Maschoff Brennan (57) ABSTRACT

In one example embodiment, a transmitter comprises a first component coupled to receive a signal for transmission and a second component communicatively coupled to the first component to transmit the signal over a transmission medium. The transmitter further comprises a planar transmission line formed on a substrate and disposed between the first and second components to couple the signal from the first component to the second component. The planar transmission line includes a first transmission line element formed on the substrate and configured to suppress radiation of EMI at a predetermined frequency.

21 Claims, 10 Drawing Sheets

EMI TRAP USING MICROWAVE CIRCUIT

BACKGROUND OF THE INVENTION

1. Field of the Invention

The present invention generally relates to microwave circuit technology. In particular, some example embodiments relate to trapping or filtering out electromagnetic interference (EMI) using microwave circuits.

2. Related Technology

Electronic devices and components operating at high frequencies typically produce and emit electromagnetic fields that cause electromagnetic interference. This electromagnetic interference, referred to as "EMI," is undesired electrical noise resulting from the electromagnetic fields. The phenomenon is undesirable because EMI can interfere with the proper operation of other electrical components.

Optical transmitter or transceiver packages, especially those operating at high transmission speeds, typically include several such electronic devices and components and are therefore especially susceptible to emitting EMI. In particular, the physical configuration of existing transmitter modules does a poor job of containing EMI—especially as the generating speed of the module increases. For example, optical transmitters often emit unacceptable levels of EMI at frequencies that are a multiple of the transmission bit rate (e.g., 10 Gbps, 20 Gbps, or 30 Gbps).

Mechanical means, such as an EMI cage, can be useful in limiting some of the EMI emissions from electronic packages. For example, an EMI cage can be sized to fit about the exterior portion of a transmitter module and configured to intercept EMI that is emitted from electronic components contained within the transmitter module. Such cages, while effective at reducing EMI, are nonetheless accompanied by certain disadvantages. Among these is the additional design complexity of the transmitter operating environment that results from the use of such cages, as well as the additional space required for the cages in the operating environment. Additionally, the cage is adjacent the exterior of the transmitter module, which places it further away from the EMI sources that are located within the transmitter module. As EMI commonly follows a diverging path as it radiates away from its source, this requires relatively more cage material to be used to prevent EMI emission than if the EMI were attenuated closer to the EMI source.

Furthermore, an EMI cage typically has one or more entry points for inputs and/or outputs through which EMI may escape. An EMI gasket and/or EMI paste can be used to reduce such emissions, but some EMI will often escape through the entry point(s), particularly due to components that may be located near the entry point(s). The EMI cage will also do little to prevent EMI from affecting other components within the cage.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

In general, example embodiments of the invention relate to microwave circuits for filtering EMI close to an EMI source in an electronic circuit. The microwave circuits may be incorporated into transmission lines that carry signals from the EMI source to other components of the electronic circuit.

In one example embodiment, an electronic circuit comprises a substrate and a first component mounted on the substrate and communicatively coupled to a second component. The electronic circuit further comprises a planar transmission line formed on the substrate and disposed between the first and second components to couple a signal from the first component to the second component. The planar transmission line includes a first transmission line element formed on the substrate and configured to suppress radiation of EMI at a predetermined frequency.

In another example embodiment, a transmitter comprises a first component coupled to receive a signal for transmission and a second component communicatively coupled to the first component to transmit the signal over a transmission medium. The transmitter further comprises a planar transmission line formed on a substrate and disposed between the first and second components to couple the signal from the first component to the second component. The planar transmission line includes a first transmission line element formed on the substrate and configured to suppress radiation of EMI at a predetermined frequency.

In yet another example embodiment, an electro-optical transducer module comprises a printed circuit board (PCB) including a transmission line, a laser driver mounted on the PCB, and a transmit optical sub-assembly (TOSA) coupled to the laser driver via the transmission line. The planar transmission line includes a notch filter patterned using conductive traces on a surface of the PCB.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXAMPLE EMBODIMENTS

Reference will now be made to the figures wherein like structures will be provided with like reference designations. It is understood that the figures are diagrammatic and schematic representations of example embodiments of the invention, and are not limiting of the present invention, nor are they necessarily drawn to scale.

FIGS. 1-6 disclose various aspects of some example embodiments of the invention. The embodiments described herein may, among other things, reduce electromagnetic interference (EMI) emitted from components in an electronic circuit using an inductance-capacitance (LC) notch filter. Although the embodiments are described in the context of an optical transceiver having a transmitter optical sub-assembly (TOSA), embodiments of the invention may be used to suppress EMI for components in other electronic circuits, such as high-speed modems, protocol adaptors, data interfaces, etc.

Example embodiments of LC notch filters herein may have inductance and capacitance values that are set to filter out a predetermined EMI frequency. A laser driver in an optical transmitter, for example, is known to emit EMI at a frequency that is a multiple of the transmitter's operating bit rate. Thus, when implemented in an optical transmitter, the LC notch filter's predetermined frequency is a multiple of the transmitter's operating bit rate. The LC notch filter can be incorporated into a transmission line that communicatively couples the laser driver to an associated TOSA. By incorporating the LC notch filter into the transmission line, the filter is much closer to the laser driver than an EMI cage or other mechanical EMI suppression means and is therefore more effective at reducing EMI.

Figure 1:
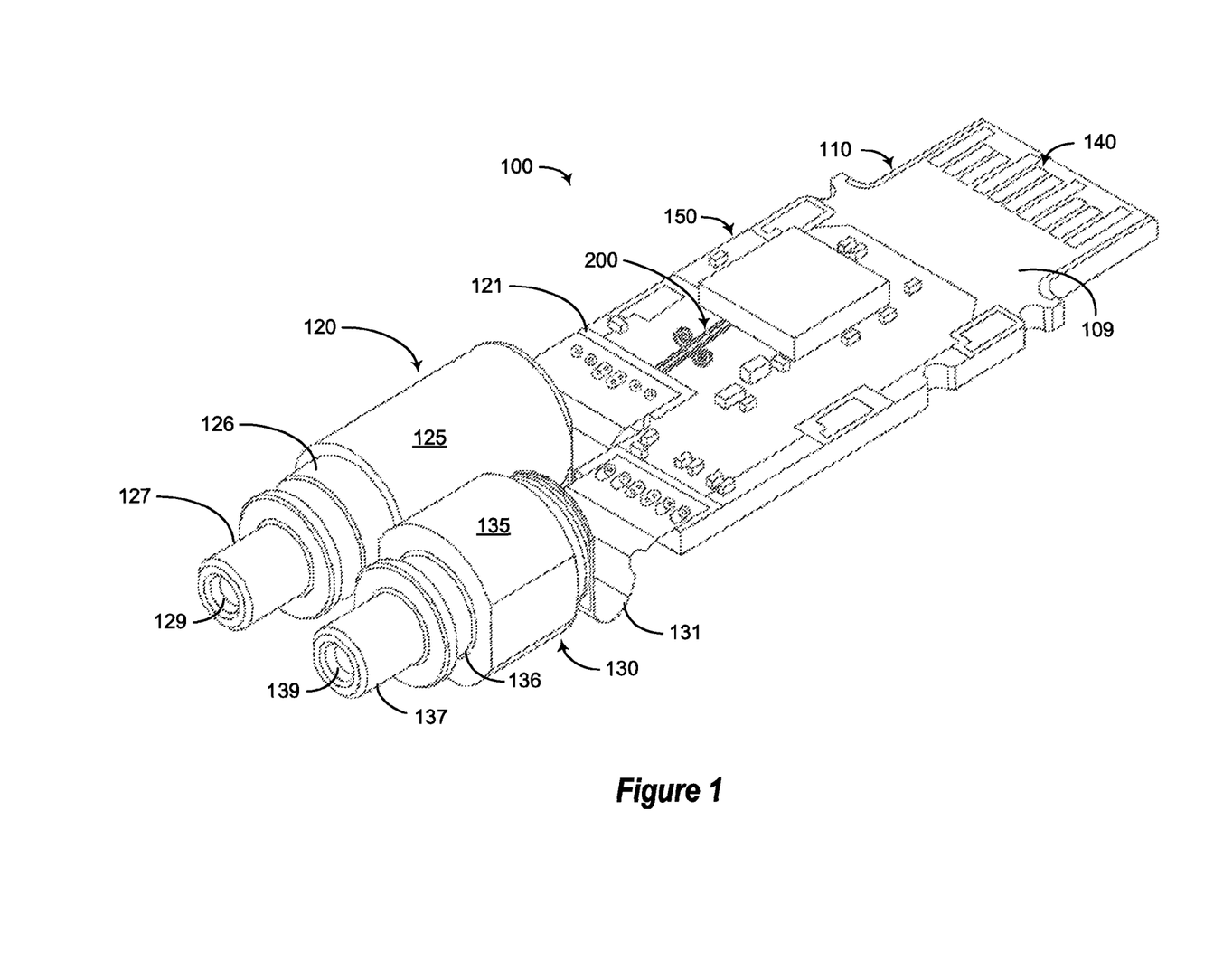
FIG. 1 is a perspective view of an optoelectronic transceiver in which embodiments of the invention may be used.

With reference to FIG. 1, an example application in which embodiments of the invention can be practiced is disclosed. FIG. 1 includes an optoelectronic transceiver 100. Optoelectronic transceiver 100 includes a printed circuit board assembly ("PCBA") 110 that includes a substrate, such as a printed circuit board ("PCB") 109, with various optical transceiver electronics mounted thereon.

As also disclosed in FIG. 1, PCBA 110 includes a TOSA 120, a receiver optical subassembly ("ROSA") 130, electrical interfaces 121 and 131, and an edge connector 140. The two electrical interfaces 121 and 131 are used to electrically connect the TOSA 120 and the ROSA 130, respectively, to the PCBA 110. Electrical interfaces 121 and 131 are depicted as including flexible circuits, which accommodate for variations in device subassembly position and enable precise connection and alignment of the TOSA, ROSA, and the PCBA, while also isolating the PCBA from vibration, thermal expansion or contraction of the adjacent devices. However, flexible circuits are not necessary to practice the invention and in some embodiments the flexible circuits may be omitted or replaced with another electrical interface structure.

TOSA 120 of the optoelectronic transceiver 100 includes a barrel 125 within which an optical transmitter, such as a laser, (not shown) is disposed. The optical transmitter is configured to convert electrical signals received through the PCBA 110 from a host device (not shown) into corresponding optical signals. The TOSA 120 also includes a flange 126 and a nose piece 127. The nose piece 127 defines a port 129. The port 129 is configured to optically connect the optical transmitter disposed within the barrel 125 with a fiber-ferrule (not shown).

Similarly, ROSA 130 of the optoelectronic transceiver 100 includes a barrel 135, a flange 136, and a nose piece 137. The nose piece 137 defines a port 139. The port 139 is configured to optically connect an optical receiver, such as a photodiode (not shown), disposed within the barrel 135 to a fiber-ferrule (not shown). The optical receiver is configured to convert optical signals received from the fiber-ferrule into corresponding electrical signals for transmission to a host device (not shown) through the PCBA 110.

As further disclosed in FIG. 1, PCBA 110 includes optical transceiver electronics 150. Such electronics may include, but are not limited to, a controller, a laser driver, and a post-amplifier, each of which is configured to help allow optoelectronic transceiver 100 to convert optical signals into electrical signals and to convert electrical signals into optical signals. PCBA 110 also includes signal traces or transmission lines that carry signals between components on PCB 109 and external to PCB 109.

As discussed above, electronics 150 will often emit undesirable noise known as EMI. A cage or shell may be used to block much of the EMI but will do little to prevent EMI from affecting other components within the cage. Moreover, EMI can leak through an opening or entry point in the cage through which TOSA 120 and ROSA 130 interconnect with optical fibers. A laser driver is a particularly troublesome source of EMI because it generates comparatively high energy signals and is typically located close to an opening associated with TOSA 120. Moreover, a current loop may be generated on the transmission line(s) between the laser driver and elements in TOSA 120, which tends to amplify the EMI. However, a significant portion of the EMI originating from the laser driver is often of a known frequency that is a multiple of the transmission bit rate. Thus, a notch filter tuned to the EMI frequency is incorporated in a transmission line 200 on PCBA 110 (shown in FIG. 2 with more detail), which can effectively reduce the EMI. Furthermore, if the notch filter is placed within a short distance from the laser driver, the size of a current loop between the laser driver and TOSA 120 can be reduced.

Figure 2:
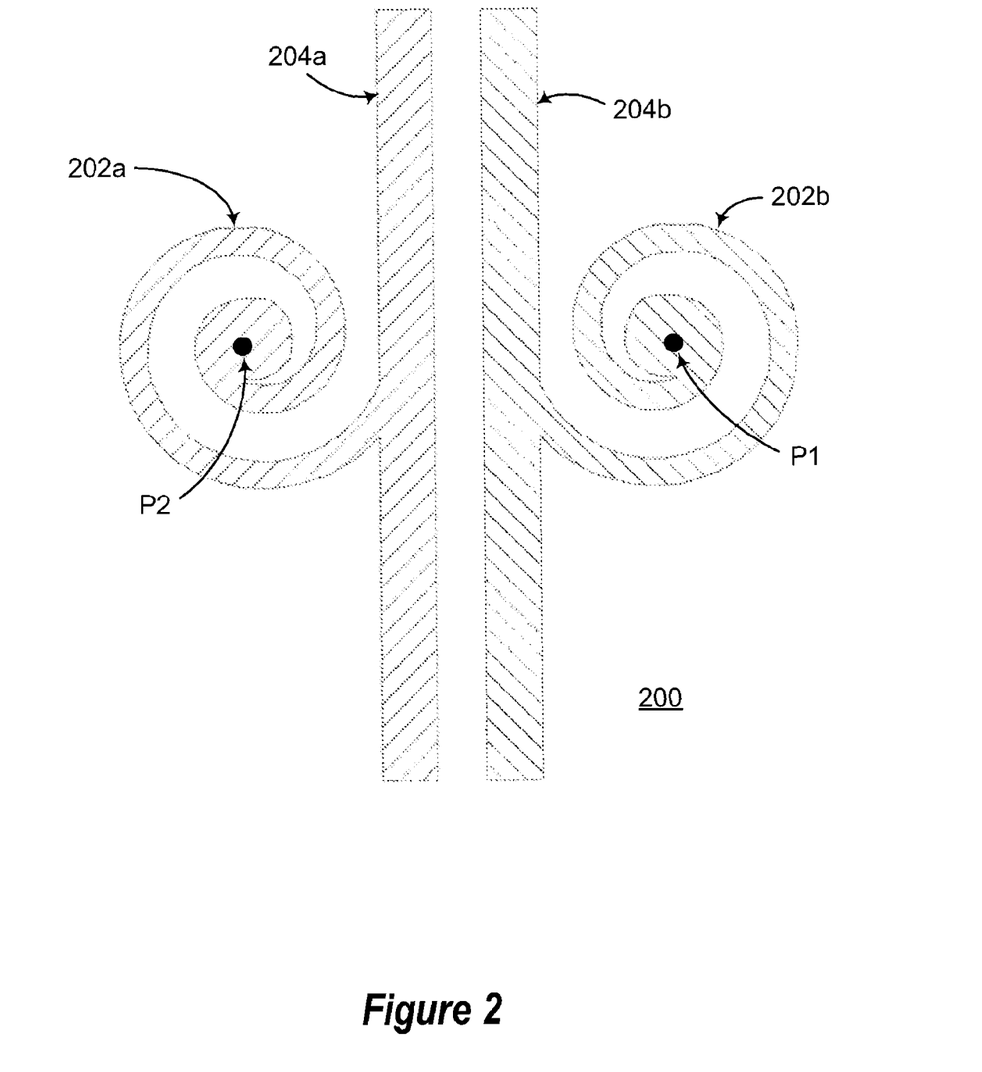
FIG. 2 is a first example differential transmission line with an LC notch filter tuned to a predetermined frequency.

With reference now to FIG. 2, an example differential transmission line 200 with an LC notch filter 202 tuned to a predetermined frequency is disclosed. Transmission line 200 includes symmetrical filter elements 202a and 202b (i.e., microwave circuits) and first and second conductive lines 204a and 204b patterned on a substrate. Referring to the optoelectronic transceiver 100 in FIG. 1, transmission line 200 may be a planar transmission line patterned on PCB 109 according to any suitable patterning or etching method (e.g., silk screen printing, photoengraving, PCB milling, plating, etc.) so as to communicatively couple a laser driver component, represented by one of electronic components 150, to electrical interface 121.

A notch filter is a band-stop filter (also referred to by those of skill in the art as a band limit, band elimination, band reject, or T-notch filter) having a relatively high Q factor. Each of symmetrical filter elements 202a and 202b of filter 202 comprises an inductive element having an associated inductance value and a capacitive element having an associated capacitance value. The inductance and capacitance values are determined by the overall geometry (e.g., line widths, sizes, shapes) of filter elements 202a and 202b. Thus, the geometry of filter elements 202a and 202b determines the EMI frequency blocked by notch filter 202 as well as the Q factor and bandwidth of the notch filter. As shown in FIG. 2, filter elements 202a and 202b may be implemented as substantially spiral inductive patterns that end with substantially circular capacitive pads. However, other geometries are contemplated, as shown in FIGS. 3 and 4, for instance.

Figure 3:
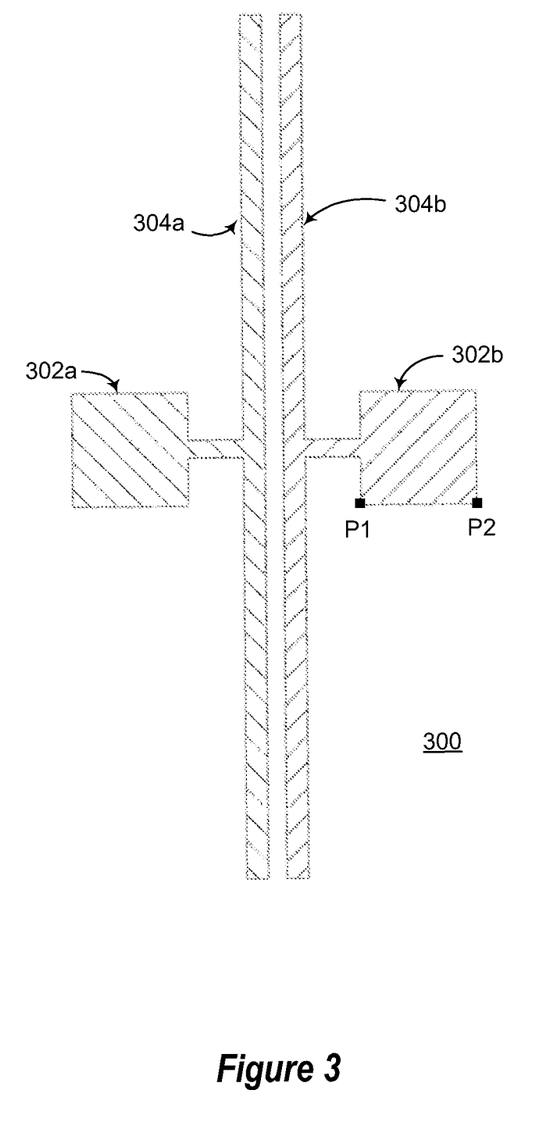
FIG. 3 is a second example differential transmission line with an LC notch filter tuned to a predetermined frequency.
Figure 4:
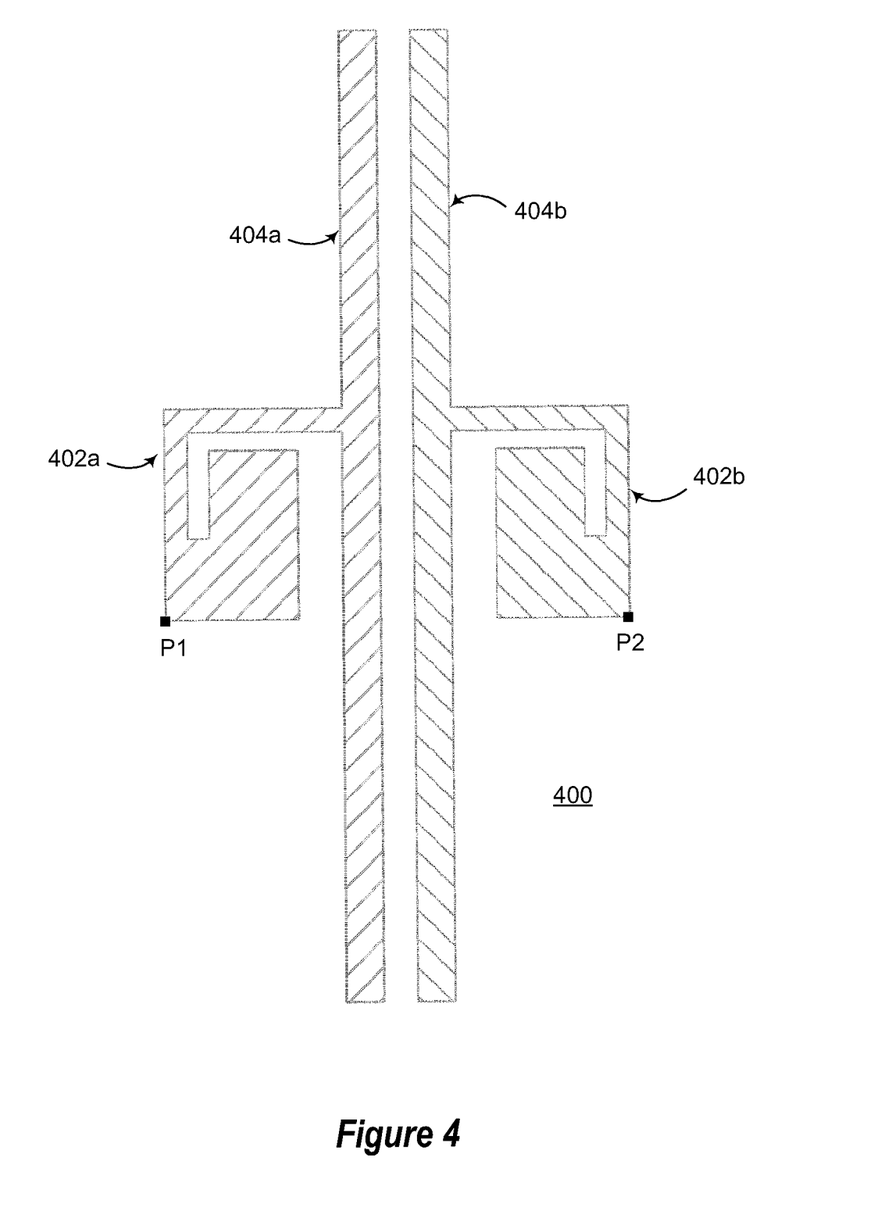
FIG. 4 is a third example differential transmission line with an LC notch filter tuned to a predetermined frequency.

FIGS. 3 and 4 depict alternative embodiments of transmission line 200 in FIG. 2. A transmission line 300 in FIG. 3 includes conductive lines 304a and 304b (corresponding in function to conductive lines 204a and 204b of transmission line 200) and LC notch filter elements 302a and 302b (corresponding in function to filter elements 202a and 202b of transmission line 200). Likewise, an LC notch filter in transmission line 400 of FIG. 4 includes conductive lines 404a and 404b (corresponding in function to conductive lines 204a and 204b of transmission line 200) and filter elements 402a and 402b (corresponding in function to filter elements 202a and 202b of transmission line 200). A capacitive component of the LC notch filter in transmission line 300 in FIG. 3 is primarily provided by square (as shown) or rectangular outer portions of filter elements 302a and 302b. An inductive component of the LC notch filter in FIG. 3 is primarily provided by the relatively smaller stub portions that couple the square/rectangular portions to conductive lines 304a and 304b.

As shown in FIG. 4, filter elements 402a and 402b are similar in certain respects to each of the corresponding filter elements of transmission lines 200 and 300. For example, filter elements 402a and 402b are substantially spiral-shaped, like those of transmission line 200, but have substantially rectangular-shaped capacitive portions, similar to those of transmission line 300.

The filter elements in each of transmission line 200, 300, and 400 may not only function as notch filters but may also serve as contact pads for coupling additional lines or signals onto the associated transmission line. For example, a laser bias voltage or current may be coupled onto the transmission line using the filter elements as contact pads. The use of a rectangular shape for the capacitive portions, as opposed to a circular shape, facilitates the use of the filter elements as contact pads. Moreover, access to the circular-shaped filter elements of transmission line 200 is at least somewhat impeded compared to the corresponding filter elements of transmission line 300 and 400 because of the spiral-shaped inductive portions surrounding the circular capacitive portions. However, all else being equal, filter 200 is smaller in overall size than filters 300 and 400.

Although transmission lines 200, 300, and 400 are primarily described herein as having application in a laser driver to TOSA connection in an optical transceiver, the invention is not limited to such applications. In alternative embodiments, transmission lines 200, 300, and 400 may couple other components on PCB 109 to each other or to other components external to PCB 109. For example, a clock and data recovery (CDR) circuit may optionally be placed between a laser driver and an associated TOSA. Thus, the laser driver may be coupled indirectly to one of transmission lines 200, 300 or 400 through a CDR circuit. Moreover, although transmission lines 200, 300, and 400 are depicted as differential microstrip transmission lines, other embodiments are contemplated in which the transmission lines are single-ended transmission lines and/or are implemented with another form of planar transmission line technology (e.g., stripline or slotline). Corresponding modifications would be made in these alternate embodiments to the associated notch filter 202, 302, or 402. For example, if a single-ended transmission line is used, a corresponding one of the filter elements (e.g., 202a or 202b) would be formed with the single-ended transmission line, the other filter element being omitted.

Figure 5A:
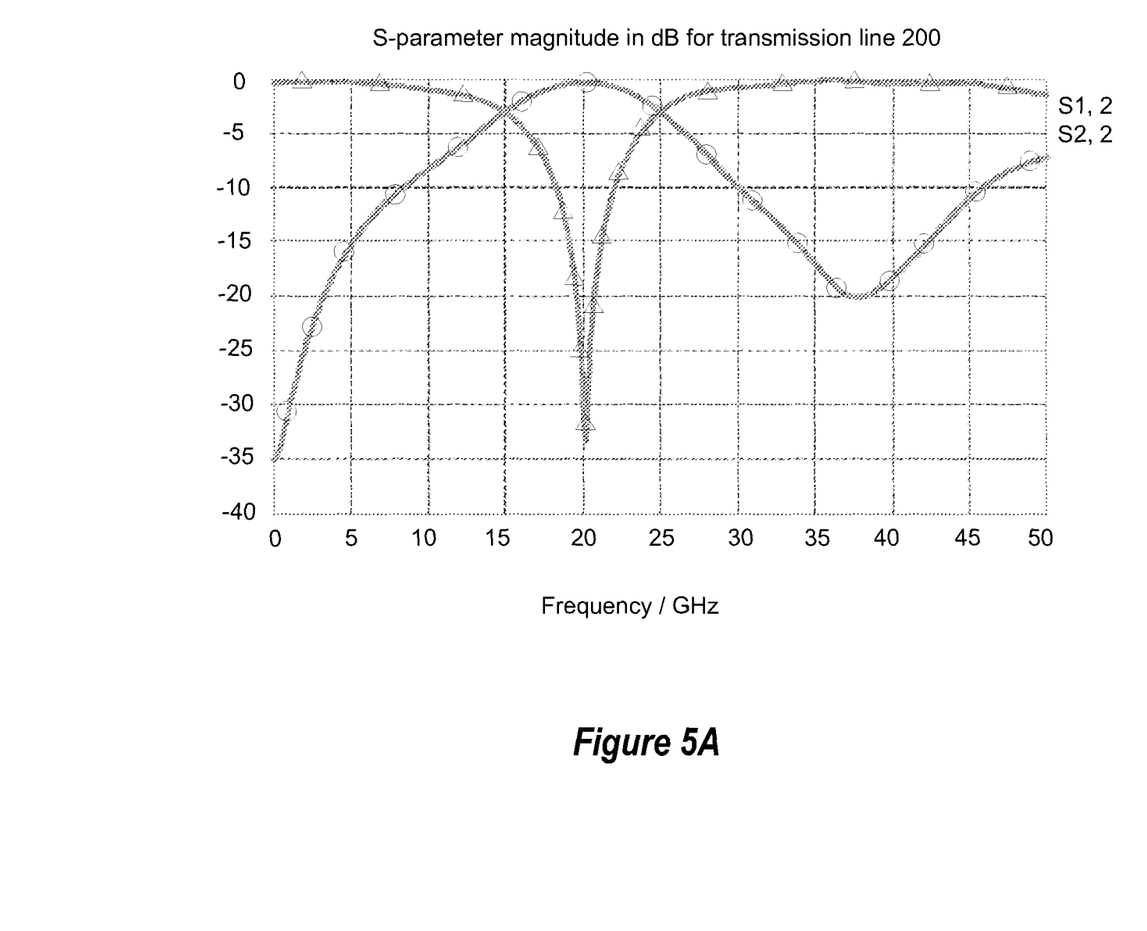
FIG. 5A is a plot of forward transmission and reflection characteristics of the transmission line in FIG. 2.
Figure 5B:
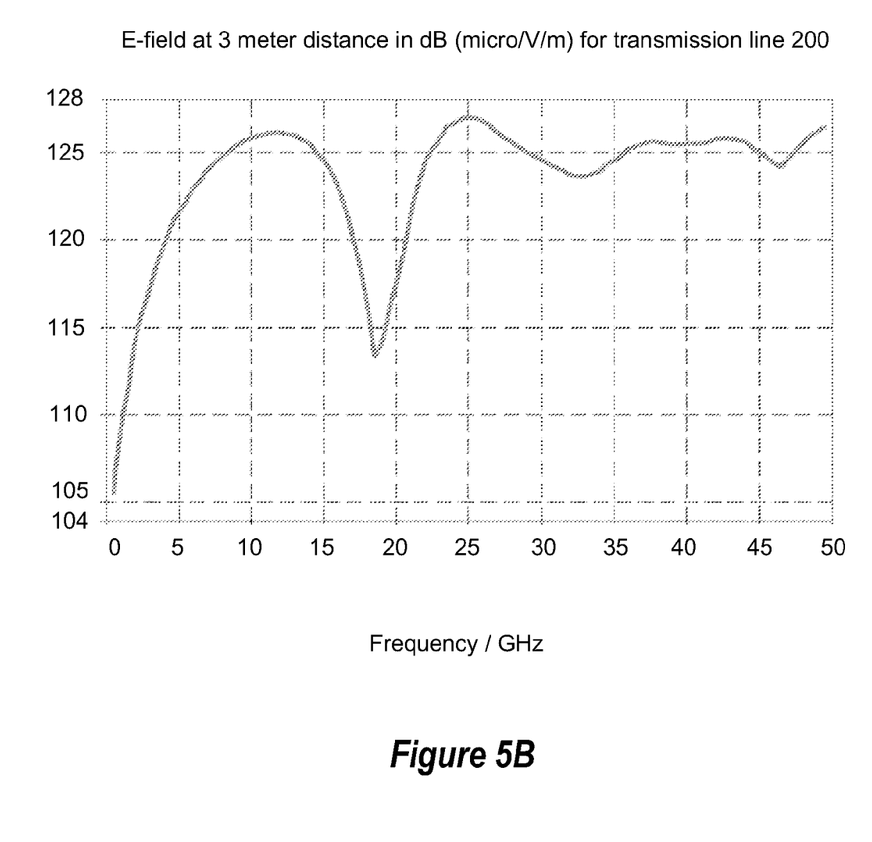
FIG. 5B is a plot of E-field strength near the transmission line in FIG. 2 during operation of an optical transmitter.
Figure 6A:
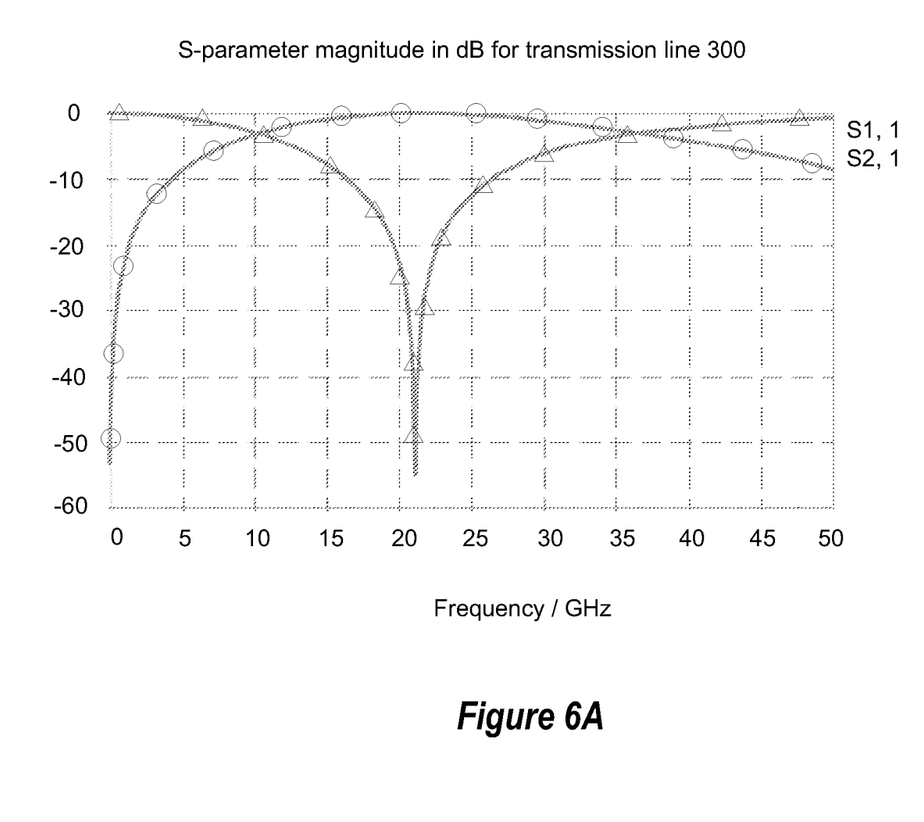
FIG. 6A is a plot of forward transmission and reflection characteristics of the transmission line in FIG. 3.
Figure 6B:
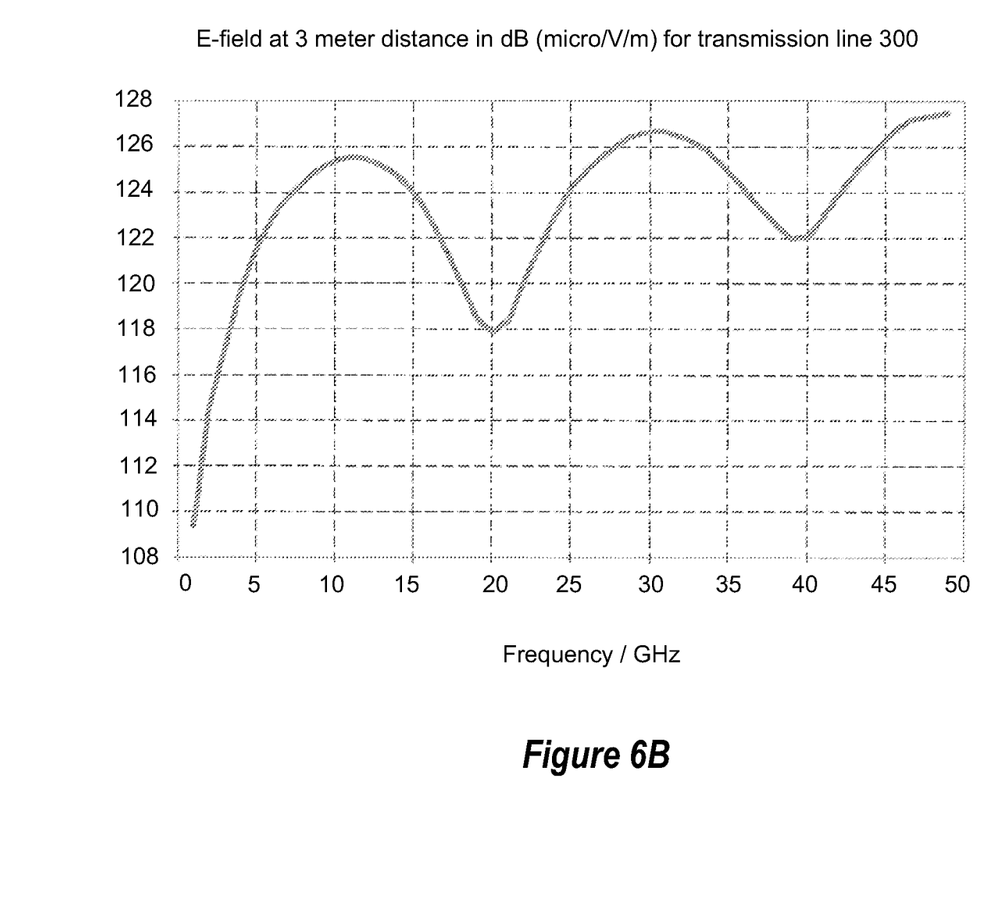
FIG. 6B is a plot of E-field strength near the transmission line in FIG. 3 during operation of an optical transmitter.
Figure 7A:
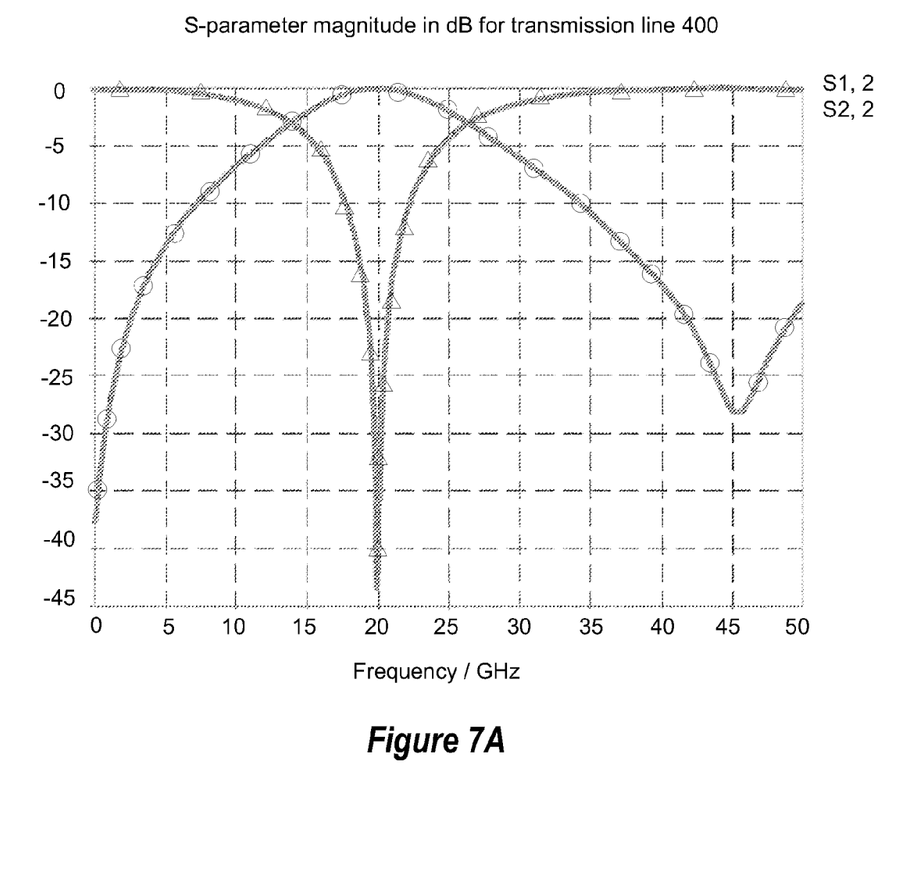
FIG. 7A is a plot of forward transmission and reflection characteristics of the transmission line in FIG. 4.
Figure 7B:
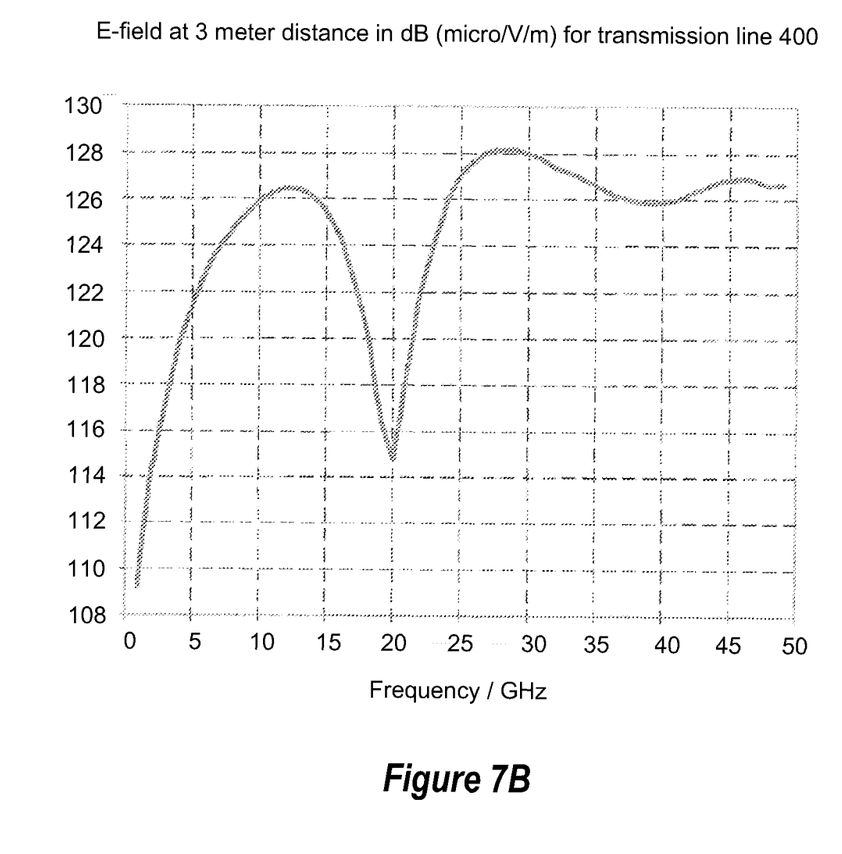
FIG. 7B is a plot of E-field strength near the transmission line in FIG. 4 during operation of an optical transmitter.

FIGS. 5A, 6A, and 7A are plots showing the forward transmission (insertion loss S12) and reflection (return loss S22) characteristics of the notch filter transmission lines in FIGS. 2, 3, and 4, respectively. FIGS. 5B, 6B, and 7B, are plots showing the strength of an E-field in a decibel scale of microvolts per meter at a distance of three meters from the transmission lines in FIGS. 2, 3, and 4, respectively, during operation of a typical optical transmitter or transceiver. The results shown in FIGS. 5-7 are for a microstrip differential transmission line where the substrate material is FR-4 and has a thickness of 4 mils. Embodiments of the invention are not limited, however, to implementations with an FR-4 substrate of 4 mils. One alternative substrate material, for example, is a ceramic submount.

Although only a few notch filters and their corresponding results are described herein, other notch filter designs and geometries may be implemented. The choice of a particular notch filter design or geometry may vary according to the criteria of a particular application. For example, in certain applications, reduction of space consumption is a primary criteria. The results in FIGS. 5A and 5B correspond to a version of transmission line 200 in FIG. 2 where the distance between the centers of each filter element (i.e., from P1 to P2) is 39 mils. The space consumed by transmission lines 300 and 400 is larger than that of transmission line 200 to achieve the comparable results shown in FIGS. 6A, 6B, 7A, and 7B. More specifically, the width of a square portion of a filter element in FIG. 3 (represented by the distance between P1 and P2) is 30 mils and the width between distal ends of the filter elements in FIG. 4 (represented by the distance between P1 and P2) is 63 mils. The foregoing sizes may be varied according to specific design parameters such as substrate thickness, material, tuning frequency, etc.

As shown in the plots, the notch filters are tuned to filter out EMI at about 20 GHz. Due to the varied design of each filter, the bandwidth and Q factor of each filter varies. For example, a filter with a wide stop bandwidth will generally have a lower Q factor relative to narrow bandwidth filters. A wider stop bandwidth may be desirable where, for example, the EMI frequency is expected to vary widely. Moreover, a relatively low Q factor may be more than adequate for practical EMI reduction purposes. For example, suppression of EMI by about 10 dB is generally acceptable for many applications. On the other hand, a narrow stop bandwidth may be more desirable relative to a wide stop bandwidth where integrity of the pass signal would otherwise be compromised by the notch filter. For example, if the stop frequency is close enough to the pass frequency, a wide stop bandwidth could disadvantageously attenuate the pass frequency.

As discussed above, EMI is emitted by components of electronic circuits and can interfere with proper operation. An example electronic circuit in which EMI is a problem is an optical transceiver, such as optical transceiver 100 in FIG. 1. In particular, signals transmitted from a laser driver or other electronic component to a TOSA are often a source of EMI, particularly due to a current loop that is frequently formed between the electronic component and radiating elements in the TOSA. However, by including a notch filter in a transmission leading from the electronic component, the EMI can be reduced to an acceptable level. Moreover, placing the notch filter elements in close proximity (e.g., about 1 mm or less in certain embodiments) will reduce the size of any current loop that might be formed. Embodiments described herein are not limited to application in an optical transceiver. For example, each of the embodiments described may be used in an optical transmitter (also referred to by those of skill in the art as an electro-optical transducer module) that differs from optical transceiver 100 by its omission of ROSA 130 and its associated circuitry.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic circuit comprising:
   a substrate;
   a first component mounted on the substrate and communicatively coupled to a second component; and
   a planar transmission line formed on the substrate and disposed between the first and second components to couple a signal from the first component to the second component, the planar transmission line including a first transmission line element formed on the substrate,
   wherein the first transmission line element extends from the planar transmission line and is configured to suppress radiation of electromagnetic interference (EMI) at a predetermined frequency.

2. The electronic circuit of claim 1, wherein the second component is a transmitter optical sub-assembly (TOSA) including a laser.

3. The electronic circuit of claim 1, wherein the first component is a laser driver.

4. The electronic circuit of claim 1, further comprising one or more mechanical EMI suppression features.

5. The electronic circuit of claim 4, wherein the one or more mechanical EMI suppression features includes an EMI cage.

6. The electronic circuit of claim 1, wherein the first transmission line element includes a passive filter.

7. The electronic circuit of claim 6, wherein the filter is a notch filter.

8. The electronic circuit of claim 6, wherein the first transmission line element includes an inductive portion (L) and a capacitive portion (C) such that the filter functions as an LC notch filter tuned to the predetermined frequency.

9. The electronic circuit of claim 1, further comprising a transmission medium communicatively coupled to the second component, wherein the predetermined frequency is a function of a rate at which the signal is transmitted over the transmission medium.

10. The electronic circuit of claim 1, wherein a capacitive portion of the first transmission line element includes a contact pad for coupling a third component.

11. The electronic circuit of claim 10, wherein the third component provides a bias signal to the second component.

12. The electronic circuit of claim 1, wherein the first transmission line element includes a substantially spiral shaped portion.

13. The electronic circuit of claim 1, wherein the first transmission line element includes a substantially rectangular shaped portion.

14. The electronic circuit of claim 1, wherein the planar transmission line is a differential transmission line comprising two conductors.

15. The electronic circuit of claim 14, further comprising a second transmission line element, wherein the first transmission line element extends from the planar transmission line at a first one of the two conductors and wherein the second transmission element extends from a second one of the two conductors.

16. The electronic circuit of claim 15, wherein each of the first and second transmission line elements extend out in a direction that is substantially perpendicular to a direction of signal transmission along the transmission line, and wherein the first and second transmission line elements are symmetrical with respect to each other.

17. The electronic circuit of claim 1, wherein the planar transmission line is a singled-ended transmission line.

18. A transmitter comprising:
   a first component coupled to receive a signal for transmission;
   a second component communicatively coupled to the first component to transmit the signal over a transmission medium; and
   a planar transmission line formed on a substrate and disposed between the first and second components to couple the signal from the first component to the second component, the planar transmission line including a first transmission line element formed on the substrate,
   wherein the first transmission line element extends from the planar transmission line and is configured to suppress radiation of EMI at a predetermined frequency.

19. The transmitter of claim 18, wherein the first component is a laser driver, the second component is a laser, and the transmission medium is an optical fiber.

20. An electro-optical transducer module comprising:
   a printed circuit board (PCB) including a transmission line;
   a laser driver mounted on the PCB; and
   a transmit optical sub-assembly (TOSA) coupled to the laser driver via the transmission line,
   wherein the planar transmission line includes a notch filter patterned using conductive traces on a surface of the PCB.

21. The electro-optical transducer module of claim 20, wherein the transmission line includes a planar transmission line patterned using conductive traces on the surface of the PCB.

* * * * *